United States Patent [19]

Ito et al.

[11] Patent Number: 5,147,934
[45] Date of Patent: Sep. 15, 1992

[54] THERMOSETTING POWDERY COATING COMPOSITION

[75] Inventors: Haruki Ito, Chigasaki; Kenzou Maeda, Yokohama; Nobuyuki Miyazaki, Yokohama; Masao Unoki, Yokohama; Chiaki Sagawa, Tokyo; Motoi Kamba, Yokohama, all of Japan

[73] Assignees: Nippon Oil and Fats Company, Limited; Asahi Glass Company Ltd., both of Tokyo, Japan

[21] Appl. No.: 607,610

[22] Filed: Oct. 30, 1990

Related U.S. Application Data

[63] Continuation of Ser. No. 224,054, Jul. 25, 1988, abandoned.

[30] Foreign Application Priority Data

Jul. 31, 1987 [JP] Japan .................. 62-192816

[51] Int. Cl.$^5$ ............................... C08L 67/02
[52] U.S. Cl. ......................... 525/124; 525/326.3
[58] Field of Search ..................... 525/124, 326.3

[56] References Cited

U.S. PATENT DOCUMENTS 4,640,966  2/1987  Mitani et al. ............... 526/247

FOREIGN PATENT DOCUMENTS 2822116  11/1978  Fed. Rep. of Germany .
2081727  2/1982  United Kingdom .

OTHER PUBLICATIONS

Detroit Society for Painting Technology (pp. 30–37), 49th Annual Meeting of the Fed. Societies for Paint Technology, Detroit, Mich.

Primary Examiner—Paul R. Michl
Attorney, Agent, or Firm—Frishauf, Holtz, Goodman & Woodward

[57] ABSTRACT

The thermosetting powdery coating composition of the invention comprises (A) from 40 to 98 parts by weight of a fluorinecontaining copolymer, which is a copolymer of a fluoroolefin and a comonomer having a crosslinkable reactive group, e.g., hydroxy, carbonyl, amino and glycidyl groups, containing at least 10% by weight of fluorine and having an intrinsic viscosity of 0.05-2 dl/g (30° C., tetrahydrofuran) and a glass transition temperature of 30°–120° C. and (B) from 60 to 2 parts by weight of a curing agent capable of forming crosslinks by reacting with the crosslinkable reactive groups in (A). The powdery coating composition of the invention is excellent in the dispersibility of pigments and efficiency in the coating works therewith and capable of giving a coating film having improved adhesion to the substrate surface, surface luster, impact resistance and insusceptibility to stain.

14 Claims, No Drawings

THERMOSETTING POWDERY COATING COMPOSITION

This application is a continuation of application Ser. No. 07/224,054, filed Jul. 25, 1988 now abandoned.

BACKGROUND OF THE INVENTION

The present invention relates to a thermosetting powdery coating composition having excellent dispersibility of pigments and workability in coating works and capable of forming a coating film having excellent surface luster, insusceptibility to stains, impact resistance, weatherability and the like.

As is known, the techniques of powder coating are widely practiced in recent years for coating of metal-made bodies in general by virtue of the advantages in respect of material saving and energy saving as well as absence of problems due to environmental pollution. In particular, the techniques of powder coating are useful for coating of various substrate bodies of which high weatherability of the coating films is essential such as transportation and living structures, e.g., bridges, parapets, gates, fences, sidings of houses and the like, bodies and parts of automobiles, electric applicances and so on.

Powdery coating compositions used for powder coating are classified into thermoplastic and thermosetting powder coating composition depending on the type of the polymeric resin as the vehicles. For example, Japanese Patent Kokai 61181567, 61-181571 and 61-181572 disclose a thermoplastic powder coating composition of which the vehicle resin is a thermoplastic fluorocarbon resin such as a copolymer of ethylene and tetrafluoroethylene.

Several kinds of thermosetting powdery coating compositions used for powder coating are also known including polyester resinbased powdery coating compositions using a blocked isocyanate compound, triglycidyl isocyanurate and the like as the curing agent and powder coating compositions based on acrylic resins having glycidyl groups and using a dibasic acid as the curing agent (see, for example, "Funtai to Kogyo", February, 1984 issue, pages 33 to 42).

Though excellent in the weatherability of the coating films, the first mentioned thermoplastic fluorocarbon resin-based powdery coating compositions have several disadvantages that, in addition to the poor dispersibility of pigments, surface luster of the coating films and adhesion of the coating film to the substrate surface, the coating composition must be heated in the coating works to a temperature higher than the high melting point of the fluorocarbon resin consequently with poor workability and consumption of a large quantity of thermal energy.

The thermosetting powder coating compositions such as the above mentioned polyester resin-based and acrylic resin-based ones, on the other hand, are defective due to the relatively low weatherability of the coating films although they are free from the above mentioned problems in the thermoplastic fluorocarbon resin-based powdery coating compositions.

SUMMARY OF THE INVENTION

The present invention accordingly has an object to provide a novel and improved thermosetting powdery coating composition having excellent dispersibility of pigments and workability in the coating works and capable of forming a coating film having excellent adhesion to the substrate surface, surface luster, insusceptibility to stain and impact resistance as well as high weatherability not inferior to thermoplastic fluorocarbon resin-based powdery coating compositions.

The thermosetting powdery coating composition of the present invention developed as a result of the extensive investigations undertaken with the above mentioned object comprises (A) a specific reactive fluorine-containing copolymer and (B) a curing agent for the component (A).

In particular, the thermosetting powdery coating composition of the invention comprises, in admixture: (A) from 40 to 98 parts by weight of a fluorine-containing copolymer comprising a monomeric moiety derived from a fluoroolefin compound and having crosslinkable reactive groups, of which the content of fluorine is at least 10% by weight, the intrinsic viscosity determined at 30° C. in tetrahydrofuran is in the range from 0.05 to 2 dl/g and the glass transition temperature is in the range from 30° to 120° C.; and (B) from 60 to 2 parts by weight of a curing agent capable of forming crosslinks by reacting with the crosslinkable reactive groups in the fluorine-containing copolymer as the component (A).

As to the density of the crosslinkable reactive groups in the polymeric molecules of the fluorine-containing copolymer as the component (A), it is particularly preferable that the average molecule weight of the polymeric molecular chains is in the range from 250 to 25,000 per one of the crosslinkable reactive groups.

DETAILED DESCRIPTION OF THE PREFERRED EMBODIMENTS

As is described above, the base ingredient in the inventive thermosetting powdery coating composition is a fluorine-containing copolymer comprising a monomeric moiety derived from a fluoroolefin compound and having crosslinkable reactive groups.

The fluoroolefin compound as one of the constituents of the fluorine-containing copolymer as the component (A) of the inventive composition is exemplified by tetrafluoroethylene, chlorotrifluoroethylene, trifluoroethylene, vinylidene fluoride, hexafluoropropylene, pentafluoropropylene and the like and appropriately selected depending on the properties required of the coating film and the comonomer to be copolymerized therewith or the curing agent as the component (B) combined with the fluorine-containing copolymer. It is of course optional according to need that two kinds or more of the fluoroolefin compounds are used in combination.

The above mentioned crosslinkable reactive group in the fluorine-containing copolymer is exemplified by hydroxy group, carboxyl group, amido group, amino group, mercapto group, glycidyl group, active halogens, e.g., bromine and iodine, isocyanate group and the like. It is optional that two kinds or more of these reactive groups are contained in the same fluorine-containing copolymer.

The crosslinkable reactive groups can be introduced into the fluorine-containing copolymer by several methods including a method in which a monomer having the crosslinkable reactive group is copolymerized with the fluoroolefin compound, a method in which a specific precursor copolymer is subjected to partial decomposition to form the crosslinkable reactive groups, a method in which a precursor copolymer having functional groups is reacted with a compound having a crosslinkable reactive group, and so on.

The above mentioned method of copolymerization can be performed, for example, by copolymerizing a fluoroolefin compound with a monomeric compound having polymerizable ethylenic unsaturation and having, as a preferable crosslinkable reactive group, a hydroxy group or a group convertible into a hydroxy group. Examples of such a monomeric compound having a hydroxy group or a group convertible into a hydroxy group include hydroxyalkyl vinyl ethers, e.g., hydroxyethyl vinyl ether, hydroxypropyl vinyl ether, hydroxybutyl vinyl ether, hydroxy isobutyl vinyl ether, hydroxycyclohexyl vinyl ether and the like, vinyl hydroxysubstituted carboxylates, e.g., vinyl hydroxyacetate, vinyl hydroxypropionate, vinyl hydroxybutyrate, vinyl hydroxyvalerate, vinyl hydroxy isobutyrate, vinyl hydroxycyclohexane carboxylate and the like, hydroxyalkyl allyl ethers, e.g., hydroxyethyl allyl ether, hydroxypropyl allyl ether, hydroxybutyl allyl ether, hydroxy isobutyl allyl ether, hydroxycyclohexyl allyl ether and the like, hydroxyalkyl allyl esters, e.g., allyl hydroxyacetate, allyl hydroxypropionate, allyl hydroxybutyrate, allyl hydroxy isobutyrate, allyl hydroxycyclohexane carboxylate and the like, and hydroxyalkyl acrylates and methacrylates, e.g., 2-hydroxyethyl acrylate, hydroxypropyl acrylate, 2-hydroxyethyl methacrylate, hydroxypropyl methacrylate and the like, as well as derivatives thereof by substitution of fluorine atoms for a part of hydrogen atoms. It is optional that two kinds or more of these monomers are used in combination according to need. In view of the copolymerizability with the fluoroolefin compound, it is preferable to use the vinyl monomers or allyl monomers among the above named compounds.

The monomeric compounds having a carboxyl group as the crosslinkable reactive group and copolymerizable with the fluoroolefin compound are exemplified by acrylic acid, methacrylic acid, carboxyalkyl allyl ethers and the like.

The monomeric compounds having a glycidyl group as the crosslinkable reactive group and copolymerizable with the fluoroolefin compound are exemplified by glycidyl acrylate, glycidyl methacrylate, glycidyl vinyl ether, glycidyl allyl ether and the like.

The monomeric compounds having an amino group as the crosslinkable reactive group and copolymerizable with the fluoroolefin compound are exemplified by aminoalkyl vinyl ethers, aminoalkyl allyl ethers and the like.

The monomeric compounds having an amido group as the crosslinkable reactive group and copolymerizable with the fluoroolefin compound are exemplified by acrylamide, methacrylamide, N-methylol acrylamide and the like.

The monomeric compounds having an nitrile group as the crosslinkable reactive group and copolymerizable with the fluoroolefin compound are exemplified by acrylonitrile, methacrylonitrile and the like.

The monomeric compounds having an isocyanate group as the crosslinkable reactive group and copolymerizable with the fluoroolefin compound are exemplified by vinyl isocyanate, isocyanatoethyl acrylate and the like.

The monomeric compounds having an active halogen atom as the crosslinkable reactive group and copolymerizable with the fluoroolefin compound are exemplified by vinyl chloride, vinylidene chloride and the like.

The method for the preparation of the copolymer as the component (A) by the partial decomposition of a precursor copolymer is performed, for example, by first copolymerizing the fluoroolefin compound with a monomer having an ester group susceptible to hydrolysis after copolymerization and then hydrolyzing the copolymer to produce carboxyl groups in the copolymer.

Alternatively, the ester groups introduced into the polymeric molecules can be utilized directly as the crosslinkable reactive groups in the curing reaction by an ester exchange reaction without being hydrolyzed beforehand into carboxyl groups.

The method for the preparation of the copolymer as the component (A) by the polymer reaction of a precursor copolymer with a compound capable of giving a crosslinkable reactive group is performed, for example, by a reaction of a hydroxycontaining copolymer with an anhydride of a dibasic carboxylic acid such as succinic anhydride and the like to introduce carboxylic groups into the molecular structure of the copolymer.

It is optional or sometimes preferable that the fluorine-containing copolymer as the component (A) is prepared by the copolymerization of a fluoroolefin compound, a comonomer for introducing crosslinkable reactive groups and, further, one or more of other comonomers copolymerizable with the former two comonomers with an object to decrease the melting point or glass transition temperature of the fluorine-containing copolymer and to further improve the workability in the coating works by using the inventive coating composition or to impart the coating films formed from the inventive coating composition with desirable properties such as appropriate hardness, flexibility, surface luster and the like.

Such a third comonomer should have an active ethylenically unsaturated linkage copolymerizable with the fluoroolefin compound and should have no adverse influences on the weatherability of the coating films formed from the inventive coating composition. Examples of a monomeric compound suitable as the third comonomer include alkyl vinyl ethers, e.g., ethyl vinyl ether, propyl vinyl ether, butyl vinyl ether, isobutyl vinyl ether, cyclohexyl vinyl ether and the like, vinyl carboxylates, e.g., vinyl acetate, vinyl propionate, vinyl butyrate, vinyl isobutyrate, vinyl valerate, vinyl cyclohexane carboxylate and the like, alkyl allyl ethers, e.g., ethyl allyl ether, propyl allyl ether, butyl allyl ether, isobutyl allyl ether, cyclohexyl allyl ether and the like, allyl carboxylates, e.g., allyl acetate, allyl propionate, allyl butyrate, allyl isobutyrate, allyl cyclohexylate and the like, alkenes, e.g., ethylene, propylene, butylene, isobutylene and the like, acrylic and methacrylic acids and esters thereof, e.g., ethyl acrylate, propyl acrylate, butyl acrylate, isobutyl acrylate, 2-ethylhexyl acrylate, ethyl methacrylate, propyl methacrylate, butyl methacrylate, isobutyl methacrylate, 2-ethylhexyl methacrylate and the like, and so on as well as derivatives thereof by substitution of fluorine atoms for a part of the hydrogen atoms therein, of which vinyl, allyl and alkene compounds are preferred in view of the copolymerizability with the fluoroolefin compound. These monomeric compounds can be used either singly or as a combination of two kinds or more according to need. When the third comonomer is a vinyl or allyl carboxylate or a vinyl or allyl alkyl ether, it is preferable that the carboxyl group in the ester or the alkyl group in the ether has 2 to 10 carbon atoms and the structure thereof is straightly linear, branched or alicyclic.

It is important that the fluorine-containing copolymer as the component (A) in the inventive thermosetting powdery coating composition contains at least 10% by weight of fluorine. The fluorine content of the copolymer is usually related to the molar fraction of the monomeric moiety in the copolymer derived from the fluoroolefin compound as one of the comonomers. It is a possible way, however, that the fluorine content of the copolymer is increased or decreased by a polymer reaction of a copolymer prepared by the copolymerization of the comonomers in a suitable proportion.

When the fluorine content of the fluorine-containing copolymer as the component (A) is lower than 10% by weight, no sufficiently high weatherability can be imparted to the coating film formed from the coating composition. It is particularly preferable that the fluorine content of the fluorine-containing copolymer as the component (A) is in the range from 15 to 72% by weight from the standpoint of obtaining a good balance between the weatherability of the coating films and the workability in the coating works with the inventive powdery coating composition.

In addition to the limitation that the fluorine content thereof is at least 10% by weight, it is preferable that the fluorine-containing copolymer as the component (A) in the inventive composition is composed of the monomeric units of which from 30 to 70% by moles are the units derived from the fluoroolefin compound. A remarkable improvement can be obtained in the weatherability of the coating film when the fluorine-containing copolymer contains 30% by moles or more of the fluoroolefin units. The upper limit of 70% by moles of the fluoroolefin units is given in consideration of the advantages obtained thereby that the fluorine-containing copolymer is predominantly amorphous or non-crystalline so that the coating film formed from the coating composition may have a uniform and smooth surface and exhibit good adhesion to the substrate surface and, moreover, the baking treatment of the coating films can be performed at a reasonable temperature not unduly high.

The fluorine-containing copolymer as the component (A) in the inventive thermosetting powdery coating composition has crosslinkable reactive groups which pertain to the reaction with the curing agent as the component (B) to give a tenacious coating film exhibiting good adhesion to the substrate surface. In this regard, the density of the crosslinkable reactive groups in the fluorine-containing copolymer is an important factor. For example, the average molecular weight of the copolymeric molecules per one of the crosslinkable reactive groups is preferably in the range from 250 to 25,000. When the density of the crosslinkable reactive groups is too small, the crosslinking density in the coating film is too low so that the coating film has poor properties such as decreased solvent resistance. When the density of the crosslinkable reactive groups is too high, on the other hand, the crosslinking density in the coating film is too high to cause a decrease in the flexibility of the coating films.

The above mentioned average molecular weight of the molecular chain per one of the crosslinkable reactive groups of the fluorine-containing copolymer is a value given by:

$$\frac{\text{(molecular weight of the fluorine-containing copolymer)}}{\text{(number of the crosslinkable reactive groups per molecule)}}$$

More particularly, the average molecular weight implied above is given by:

$[56.1/(\text{value of crosslinkable reactive groups})] \times 10^3$, in which the numerical figure 56.1 corresponds to the molecular weight of potassium hydroxide KOH and the value of crosslinkable reactive groups is the hydroxy value, acid value, epoxy equivalent or the like given in mg KOH/g as determined by the methods of infrared absorption spectrophotometric analysis, NMR spectrometric analysis, chemical titrimetric analysis and the like.

When the crosslinkable reactive group is an epoxy group, the epoxy equivalent can be used as the value of the crosslinkable reactive groups.

When the crosslinkable reactive groups of the fluorine-containing copolymer as the component (A) are hydroxy groups, the copolymer should preferably have a hydroxyl value in the range from 1 to 200 mg KOH/g or, more preferably, from 20 to 140 mg KOH/g. When the hydroxyl value is too small, the coating film may have poor properties due to the deficiency in the crosslinking density. When the hydroxyl value is too large, on the other hand, the flexibility of the coating films may be somewhat decreased due to the excessively high crosslinking density.

It is also essential that the fluorine-containing copolymer as the component (A) in the inventive coating composition has an intrinsic viscosity as determined at 30° C. in tetrahydrofuran in the range from 0.05 to 2 dl/g. When the intrinsic viscosity of the copolymer is too low, the copolymer cannot be a solid capable of being divided into fine particles so that the copolymer cannot be used as a constituent of the powdery coating composition. When the intrinsic viscosity of the copolymer is too high, on the other hand, the powdery coating composition may have decreased spreadability due to the increase in the softening point of the copolymer not to give a uniform coating film.

It is also important that the fluorine-containing copolymer has a glass transition temperature in the range from 30° to 120° C. or, preferably, from 35° to 100° C. When the glass transition temperature of the copolymer is too low, the copolymer cannot be a solid capable of being finely divided into fine particles so that the copolymer cannot be used as a constituent of the powdery coating composition. When the glass transition temperature of the copolymer is too high, on the other hand, the powdery coating composition may have decreased spreadability due to the increase in the softening point of the copolymer not to give a uniform coating film.

It is not preferable that the fluorine-containing copolymer used as the copolymer (A) has a high crystallinity because the baking treatment of a coating film by use of such a copolymer must be performed at an increased temperature. A fluorine-containing copolymer having crystallinity, however, can be used as the component (A) when the melting point thereof does not exceed 200° C.

The fluorine-containing copolymer used as the component (A) can be prepared by several known methods. For example, the comonomers in admixture with addition of a polymerization initiator are copolymerized in the presence or absence of a catalyst. The copolymerization reaction can be performed in any procedure of solution polymerization, emulsion polymerization and suspension polymerization.

Since the fluorine-containing copolymer is used as the component (A) in the inventive coating composition in a powdery form, it is important that the copolymerization reaction is performed in such an appropriate manner depending on the respective type of the polymerization reaction that the copolymer can be obtained in a powdery form of a desired fineness.

When the fluorine-containing copolymer is prepared by a process of emulsion polymerization or suspension polymerization, the polymerization medium is removed from the polymerizate mixture by evaporation at a temperature of 50° to 100° C. under a reduced pressure of 10 mmHg or below and the dried polymerizate is pulverized by using a suitable pulverizing machine such as Willie type, vibration mill type and hammer mill type ones. When the fluorine-containing copolymer is prepared by a process of solution polymerization, the solvent of the polymerizate solution is evaporated to leave the copolymer in a dry form or the polymerizate solution is poured into another solvent having no dissolving power of the copolymer so as to precipitate the copolymer in the mixture which is collected by filtration and dried followed by pulverization.

The fluorine-containing copolymer used as the component (A) in the form of a finely divided powdery form should be as completely dry as possible. It is desirable in this regard that the residual content of the solvent or the polymerization medium contained therein, which can be determined as a weight loss by heating, does not exceed 5% by weight. When the powdery fluorine-containing copolymer contains an excessively large amount of the residual solvent or polymerization medium, several disadvantages are caused thereby that the storage stability of the powdery coating composition is decreased and that foams, blisters, pin holes and other defects are sometimes formed in the coating films after a baking treatment for curing. It is more desirable that the content of the residual solvent or polymerization medium does not exceed 2% by weight.

The component (B) combined with the above described component (A) is a curing agent which is exemplified by polyisocyanate compounds or blocked isocyanate compounds such as isophorone diisocyanate, tolylene diisocyanate, xylylene diisocyanate, 4,4'-diphenyl methane diisocyanate, hexamethylene dissocyanate and the like, dimers and trimers thereof and polyisocyanate compounds modified with a polyhydric alcohol, e.g., trimethylol propane, and blocked at the isocyanate groups with a blocking agent such as $\epsilon$-caprolactam, phenol, benzyl alcohol, methyl ethyl ketoxime and the like. The blocked isocyanate compound is preferably solid at room temperature.

Further examples of the curing agent as the component (B) include dibasic aliphatic carboxylic acids, e.g., fumaric acid, succinic acid, adipic acid, azelaic acid, sebacic acid, dodecane dicarboxylic acid and the like, acid anhydrides, e.g., phthalic anhydride, trimellitic anhydride, pyromellitic anhydride and the like, polyester resins or acrylic resins having an acid value of 10 to 300 mg KOH/g, glass transition temperature of 30° to 120° C. and number-average molecular weight of 1000 to 15,000, dicyandiamide and derivatives thereof, imidazole and derivatives thereof, amine compounds such as diaminophenyl methane, cyclic amidine compounds and the like, melamine resins, glycidyl compound such ass diglycidyl terephthalate, diglycidyl p-hydroxybenzoate, triglycidyl isocyanurate, spiroglycol diglycidyl ether, hidantoin compounds, alicyclic epoxy resins and the like, 1,4-bis(2'-hydroxyethoxy) benzene, bis(hydroxyethyl) terephthalate, copolymers of styrene and allyl alcohol, spiroglycol, tris(2-hydroxyethyl) isocyanurate, hydroxy-containing polymeric compounds such as polyester resins and acrylic resins having a hydroxyl value of 10 to 300 mg KOH/g, glass transition temperature of 30° to 120° C. and number-average molecular weight of 1000 to 15,000 and so on. The curing agent selected from the above named compounds is preferably solid at room temperature.

The thermosetting powdery coating composition of the present invention is prepared by formulating the above described fluorine-containing copolymer as the component (A) and the curing agent as the component (B) in a weight ratio in the range from 40:60 to 98:2 or, preferably, in the range from 50:50 to 97:3.

The thermosetting powdery coating composition of the present invention has a glass transition temperature in the range from 30° to 120° C. or, preferably, in the range from 35° to 100° C. When the glass transition temperature is too low, the composition is hardly in a condition of solid so that the composition cannot be used as a powdery coating composition. When the glass transition temperature is too high, on other hand, the powdery composition is poorly spreadable due to the increase in the softening point so that no uniform coating films can be obtained.

The thermosetting powdery coating composition of the invention should contain volatile matters in an amount as small as possible. For example, the weight loss of the composition by heating should not exceed 5% by weight or, preferable, 2% by weight. When the weight loss by heating of the composition is too large, disadvantages are caused that the storage stability of the powdery coating composition is decreased and the coating film formed from the coating composition is sometimes defective due to the formation of foams, blisters, pin holes and the like.

The thermosetting powdery coating composition of the present invention can be admixed according to need with various kinds of additives conventionally formulated in coating compositions. Examples of the additives compounded with the inventive powder coating composition include pigments, i.e. inorganic pigments, e.g., titanium dioxide, red and yellow iron oxides, carbon black and the like, and organic pigments, e.g., phthalocyanine blue, phthalocyanine green, quinacridone-based red pigments, isoindolinone-based yellow pigment, and the like, extender pigments such as talc, silica, calcium carbonate and the like, metal powders such as aluminum powder, stainless steel powder and the like, mica flakes, levelling agents, ultraviolet absorbers, thermal aging retarders, foaming preventing agents and so on. These additives can be used wither singly or as a combination of two kinds or more according to need. These additives can be compounded beforehand with either the component (A) or the component (B).

The thermosetting powdery coating composition of the invention can be prepared by compounding the above described components in the same manner as in the preparation of conventional thermosetting powdery coating compositions.

The thermosetting powdery coating composition prepared in the above described manner has a particle diameter not exceeding 40 μm and is capable of forming a high-quality coating film on the surface of substrates of metals and alloys such as iron, aluminum, copper, zinc, stainless steel, brass and the like in a uniform thickness by using an electrostatic powder coating machine, fluidized immersion machine and the like followed by baking in a hot air circulation oven, infrared oven, induction heating oven and the like.

In the following, the thermosetting powdery coating composition of the invention is described in more detail by way of examples and comparative examples beginning with description for the preparation of the fluorine-containing copolymers. In the following description, the terms of "parts" and "%" all refer to "parts by weight" and "% by weight" respectively.

Preparation 1.

Into a stainless steel-made autoclave of 300 ml capacity equipped with a stirrer were introduced 157 g of tert-butyl alcohol, 16 g of cyclohexyl vinyl ether, 9 g of isobutyl vinyl ether, 25 g of hydroxybutyl vinyl ether, 1 g of potassium carbonate and 0.07 g of azobisisobutyronitrile to form a reaction mixture which was deaerated by repeating freezing and thawing using liquid nitrogen.

Then, 50 g of chlorotrifluoroethylene were introduced into the autoclave and the temperature of the mixture was gradually increased up to 65° C. The reaction mixture was continuously agitated at the same temperature for 10 hours and the autoclave was cooled in water to terminate the reaction. After cooling to room temperature, the autoclave was released to discharge the unreacted monomers.

In the next place, the reaction mixture was heated at 60° C. under a reduced pressure of 1 mmHg for 24 hours to remove the solvent. The thus obtained dry polymeric product was finely pulverized in a hammer mull to give a powdery fluorine-containing copolymer, which is referred to as the copolymer A-1 hereinbelow.

The copolymer A-1 had a hydroxyl value of 120 mg KOH/g, glass transition temperature of 45° C. and intrinsic viscosity [$\eta$] of 0.21 as determined at 30° C. in tetrahydrofuran. Analysis of the copolymer A1 indicated that the monomeric composition of the polymer was approximately identical with that in the starting monomer mixture.

Preparation 2 to 5.

The procedure for the polymerization in each of these Preparations was substantially the same as in Preparation 1 described above except that the formulation of the starting monomer mixture was as indicated in Table 1 below and the amounts of tert-butyl alcohol as the solvent and azobisisobutyronitrile were adequately modified. The thus obtained fluorine-containing copolymers are referred to as the copolymers A-2 to A-5 for the Preparations 2 to 5, respectively.

Table 1 below also shows the properties of the copolymers A-2 to A-5 including the hydroxyl value, glass transition temperature, weight loss by heating, intrinsic viscosity and average molecular weight of the polymeric molecular chains per one of the crosslinkable reactive groups.

Preparation 6.

The procedure for the polymerization of the monomer mixture was substantially the same as in the preceding Preparations except that the formulation of the starting monomer mixture was as indicated in Table 1 below. Then, 100 parts of the thus obtained copolymer were dissolved in 100 part s of xylene together with 0.9 part of succinic anhydride and 0.05 part of triethyl benzyl ammonium chloride. The solution was agitated at 100° C. for 3 hours in a flask followed by cooling. Thereafter, the solvent in the solution was removed by heating the solution at 60° C. for 24 hours under a reduced pressure of 1 mmHg to give a dry polymeric product which was pulverized in a hammer mill into a fine powder of the fluorine-containing copolymer. This powdery fluorine-containing copolymer, referred to as the copolymer A-6 hereinbelow, had an acid value of 5 mg KOH/g indicating that carboxyl groups were introduced into the molecular structure of the copolymer. Table 1 below also shows the properties of this copolymer A-6.

TABLE 1

| Copolymer No. | A-1 | A-2 | A-3 | A-4 | A-5 | A-6 |
|---|---|---|---|---|---|---|
| Formulation of starting monomer mixture, g | | | | | | |
| CTFE | 50 | 51 | — | 48 | 54 | 53 |
| TFE | — | — | 45 | — | — | — |
| C-HXVE | 16 | 28 | 45 | 32 | 23 | 17 |
| EVE | — | 10 | — | — | 13 | 10 |
| IBVE | 9 | — | — | — | — | 9 |
| HBVE | 25 | 11 | 10 | 20 | 5 | 11 |
| VAC | — | — | — | — | 5 | — |
| Total | 100 | 100 | 100 | 100 | 100 | 100 |
| Properties of copolymer | | | | | | |
| Hydroxyl value, mg KOH/g | 120 | 55 | 50 | 94 | 26 | 46 |
| Glass transition temperature, °C. | 45 | 48 | 35 | 50 | 35 | 45 |
| Weight loss by heating, % | <2 | <2 | <2 | <2 | <2 | <2 |
| Intrinsic viscosity, dl/g | 0.21 | 0.21 | 0.33 | 0.25 | 0.22 | 0.26 |
| Average molecular weight per one crosslinkable reactive group | 468 | 1020 | 1122 | 597 | 2158 | 1100 |

CTFE chlorotrifluoroethylene
TFE tetrafluoroethylene
C-HXVE cyclohexyl vinyl ether
EVE ethyl vinyl ether
IBVE isobutyl vinyl ether
HBVE hydroxybutyl vinyl ether
VAC vinyl acetate Preparation 7.

Into a stainless steel-made autoclave of 300 ml capacity equipped with a stirrer were introduced 157 g of tert-butyl alcohol 18 g of cyclohexyl vinyl ether, 10 g of isobutyl vinyl ether, 20 g of glycidyl vinyl ether, 1 g of potassium carbonate and 0.07 g of azobisisobutyronitrile to form a reaction mixture which was deaerated by repeating freezing and thawing using liquid nitrogen. Then, 52 g of chlorotrifluoroethylene were introduced into the autoclave and the temperature of the mixture was gradually increased up to 65° C. The reaction mixture was continuously agitated for 10 hours at the same temperature to effect the polymerization reaction and then the autoclave was cooled in water to terminate the polymerization reaction. After cooling to room temperature, the autoclave was released to discharge the unreacted monomers. Thereafter, the solvent in the reaction mixture was removed by heating the mixture at 60° C. for 24 hours under a reduced pressure of 1 mmHg to give a dry polymeric product which was then pulverized in a hammer mill to give a fine powdery of the fluorine-containing copolymer.

The thus obtained fine powder of the fluorine-containing copolymer, referred to as the copolymer A-7 hereinbelow, had an epoxy equivalent of 500 g/eq., glass transition temperature of 49° C. and intrinsic viscosity of 0.19 as determined at 30° C. in tetrahydrofuran. Analysis of the copolymer A-7 indicated that the monomeric composition of the copolymer was approximately identical with that in the starting monomer mixture.

Preparations 8 to 10.

The procedure for the polymerization reaction was substantially the same as in the preceding example except that the formulation of the starting monomer mixture in each of these examples was as indicated in Table 2 below and the amounts of tert-butyl alcohol as the solvent and azobisisobutyronitrile as the polymerization initiator were adequately modified.

Table 2 also shows the properties of the thus obtained fluorine-containing copolymers in Examples 8 to 10, referred to as the copolymers A-8 to A-10, respectively, including the epoxy equivalent, glass transition temperature, weight loss by heating and intrinsic viscosity as determined at 30° C. in tetrahydrofuran. The weight loss by heating was determined according to the method specified in JIS K 5400, 8.3.

TABLE 2

| Copolymer No. | A-7 | A-8 | A-9 | A-10 |
| --- | --- | --- | --- | --- |
| Formulation of starting monomer mixture, g | | | | |
| CTFE | 52 | 55 | 48 | 30 |
| TFE | — | — | — | 21 |
| C-HXVE | 18 | 35 | 32 | 20 |
| EVE | — | — | 15 | — |
| IBVE | 10 | — | — | 14 |
| VAC | — | — | — | 13 |
| GVE | 20 | 10 | — | 2 |
| AGE | — | — | 5 | — |
| Total | 100 | 100 | 100 | 100 |
| Properties of copolymer | | | | |
| Epoxy equivalent, g/eq. | 500 | 997 | 2180 | 10861 |
| Glass transition temperature, °C. | 49 | 55 | 51 | 37 |
| Weight loss by heating, % | <2 | <2 | <2 | <2 |
| Intrinsic viscosity, dl/g | 0.19 | 0.20 | 0.15 | 0.24 |

GVE glycidyl vinyl ether
AGE allyl glycidyl ether
See footnote to Table 1 for CTFE, TFE, C-HXVE, EVE, IBVE and VAC.

Preparation 11.

A fluorine-containing copolymer was prepared in substantially the same manner as in Preparation 7 except that the starting monomer mixture was composed of 52 g of chlorotrifluoroethylene, 28 g of cyclohexyl vinyl ether and 20 g of hydroxybutyl vinyl ether. Then, 100 parts of the copolymer was dissolved in 100 parts of xylene together with 3.6 parts of succinic anhydride and 0.05 part of triethyl benzyl ammonium chloride and the solution was continuously agitated for 3 hours at 100° C. in a flask followed by cooling. Thereafter, the solvent in the solution was removed by heating the solution at 60° C. for 24 hours under a reduced pressure of 1 mmHg to give a dry polymeric product which was pulverized in a hammer mill into a fine powder of the fluorine-containing copolymer, referred to as the copolymer A-11 hereinbelow.

Table 3 below shows the properties of the copolymer A-11 including the acid value, glass transition temperature, weight loss by heating, intrinsic viscosity as determined at 30° C. in tetrahydrofuran and average molecular weight of the polymeric molecules per one of the crosslinkable reactive groups.

Preparations 12 to 14.

The procedure was substantially the same as in the preceding preparation except that the formulation of the starting monomer mixture and the amount of succinic anhydride for the modification of the copolymers were as indicated in Table 3 and the amounts of tert-butyl alcohol and azobisisobutyronitrile were adequately modified to give powdery fluorine-containing copolymers referred to as the copolymers A-12 to A-14 hereinbelow. Table 3 below shows the properties of these copolymers.

TABLE 3

| Copolymer No. | A-11 | A-12 | A-13 | A-14 |
| --- | --- | --- | --- | --- |
| Formulation of starting monomer mixture, g | | | | |
| CTFE | 52 | 55 | 48 | 51 |
| C-HXVE | 28 | 15 | — | — |
| EVE | — | 10 | — | 10 |
| HBVE | 20 | — | 15 | 25 |
| IBVE | — | 5 | 12 | 14 |
| IPVE | — | 10 | 15 | — |
| VAC | — | 5 | 10 | — |
| Total | 100 | 100 | 100 | 100 |
| Succinic anhydride for modification, g | 3.6 | 1.8 | 0.9 | 5.0 |
| Properties of copolymer | | | | |
| Acid value, mg KOH/g | 19.5 | 10 | 5 | 26.7 |
| Glass transition temperature, °C. | 47 | 42 | 36 | 37 |
| Weight loss by heating, % | <2 | <2 | <2 | <2 |
| Intrinsic viscosity, dl/g | 0.21 | 0.16 | 0.23 | 0.24 |
| Average molecular weight per one crosslinkable reactive group | 2877 | 5610 | 11220 | 2101 |

IPVE isopropyl vinyl ether
See footnote to Table 1 for CTFE, C-HXVE, EVE, IBVE and VAC.

EXAMPLES 1 TO 8 AND COMPARATIVE EXAMPLES 1 TO 4.

Thermosetting powdery coating composition were prepared in these Examples and Comparative Examples each by uniformly compounding either one of the copolymers A-1 to A-6 (Examples) or a commercial product of a polyester or acrylic resin (Comparative Examples) shown in Table 4 below as the component (A) in an amount shown in Table 4, a curing agent as the component (B) of the kind and in an amount shown in Table 4, 30 parts of titanium dioxide and 0.5 part of a levelling agent (Modaflow, a product by Monsanto Co.).

The resinous ingredients used as the component (A) in the Comparative Examples were as shown below.

a-1: polyester containing no solvent and having an acid value of 30 mg KOH/g (Ester Resin ER-6610, a product by Nippon Ester Co.)
    a-2: polyester resin containing no solvent and having an acid value of 30 mg KOH/g (Finedick M-8020, a product by Dai-Nippon Ink Chemical Co.)

a-3: acrylic resin containing no solvent and having an epoxy equivalent of 630 g/eq. (Finedick A-223S, a product by Dai-Nippon Ink Chemical Co.)

a-4: acrylic resin containing no solvent and having an epoxy equivalent of 455 g/eq. (Almatex PD-7210, a product by Mitsui Toatsu Chemical Co.)

Further, the curing agents used as the component (B) in the Examples and Comparative Examples were as follows.

B-1: ε-caprolactam blocked isocyanate containing no solvent (Adduct B-1530, a product by Huls Co.)

B-2: urethodione compound containing no solvent (Adduct BF-1540, a product by Huls Co.)

B-3: pyromellitic anhydride

B-4: dodecane dicarboxylic acid

Table 4 below gives the kinds and amounts of the component (A), i.e. A-1 to A-6 or a-1 to a-4, and the component (B), i.e. B-1 to B-4, weight ratio of the component (B) to the component (A) and the weight loss by heating of the blend of the components (A) and (B) determined according to the method specified in JIS K 5400, 8.3.

The blend of the components (A) and (B), titanium dioxide and levelling agent was uniformly mixed for about 1 minute in a dry blender (Henschel Mixer, manufactured by Mitsui Kakoki Co.) and then kneaded under molten condition at 80° C. to 100° C. in an extrusion kneader (Buss Ko Kneader PR-46, manufactured by Buss Co.). The resin blend discharged out of the kneader was cooled and finely pulverized in a hammer mill into a fine powder from which coarser particles were removed by passing through a screen of 150 mesh fineness to give a thermosetting powdery coating composition. A steel test panel having a thickness of 0.8 mm after a zinc phosphate treatment was coated with the powdery coating composition by the method of electrostatic coating followed by a baking treatment for 20 minutes at a baking temperature indicated in Table 5 below to give a cured coating film having a thickness of 40 μm.

The test panels coated in the above described manner were subjected to the tests of several items for the coating films according to the testing procedure and giving the results shown below and in Table 5.

TABLE 4

| | Component (A) (parts) | Component (B) (parts) | Weight ratio of (B):(A) | Weight loss by heating, % |
|---|---|---|---|---|
| Example | | | | |
| 1 | A-1 (43.5) | B-1 (26.0) | 37:63 | 1.8 |

TABLE 4-continued

| | Component (A) (parts) | Component (B) (parts) | Weight ratio of (B):(A) | Weight loss by heating, % |
|---|---|---|---|---|
| 2 | A-2 (54.5) | B-1 (15.0) | 22:78 | 1.9 |
| 3 | A-3 (55.6) | B-1 (13.9) | 20:80 | 1.7 |
| 4 | A-4 (47.3) | B-1 (22.2) | 32:68 | 1.3 |
| 5 | A-5 (61.5) | B-1 (8.0) | 12:88 | 1.2 |
| 6 | A-6 (56.5) | B-1 (13.0) | 19:81 | 1.1 |
| 7 | A-6 (56.5) | B-2 (13.0) | 19:81 | 1.0 |
| 8 | A-6 (65.2) | B-3 (4.3) | 6:94 | 1.2 |
| Comparative Example | | | | |
| 1 | a-1 (60.5) | B-1 (9.0) | 13:87 | 1.3 |
| 2 | a-2 (60.5) | B-1 (9.0) | 13:87 | 1.9 |
| 3 | a-3 (59.7) | B-4 (9.8) | 14:86 | 1.6 |
| 4 | a-4 (56.6) | B-4 (12.9) | 19:81 | 1.8 |

1) Apparatus of the coating film relative to the smoothness and reflectiveness by visual inspection of the reflected image of a fluorescent lamp which may be with or without deformation: good in each of Examples 1 to 8 and Comparative Example 1 to 4

2) Surface luster (60° mirror surface luster) according to JIS K 5400, 6.7: results given in Table 5 in %

3) Impact resistance according to JIS K 5400, 6.13 B impact deformation test using a DuPont type impact tester with ½ inch diameter, 1 kg load and 50 cm height: good in each of Examples 1 to 8 and Comparative Examples 1 and 2 without breaking or exfoliation of the coating film but no good in Comparative Example 3 and 4 with breaking and exfoliation of the coating film 4) Flexibility by Erichsen tester according to JIS B 7777: 7 mm in each of Examples 1 to 8 and Comparative Example 1 to 4

5) Adhesion of coating film by checkerboard testing method according to JIS D 0202, 8.12 forming 100 checkerboard squares of 1 mm × 1 mm, cellophane-based pressure-sensitive adhesive tape of 12 mm width applied and bonded to the surface and then rapidly pulled apart by holding the tape end perpendicularly to the surface: 100/100 in each of Examples 1 to 8 and Comparative Examples 1 to 4

6) Insusceptibility to stain, line marking with a felt pen of solvent-type black ink and wiping off after 24 hours at 20° C. with a gauze wet with xylene to examine the condition of line trace: absolutely no line trace in each of Examples 1 to 8, faint but noticeable line trace in Comparative Examples 3 and 4 and clearly noticeable line trace in Comparative Examples 1 and 2

7) Weatherability by accelerated weathering test according to JIS D 0205, 7.6 for luster retention and color difference ΔE after 1000 hours and 3000 hours using Sunshine Carbon Weathermeter

TABLE 5

| | Baking temperature, °C. | Surface luster | Weatherability | | | |
|---|---|---|---|---|---|---|
| | | | After 1000 hours | | After 3000 hours | |
| | | | Luster retention, % | Color difference, ΔE | Luster retention, % | Color difference, ΔE |
| Example | | | | | | |
| 1 | 190 | 85 | 99 | 0.6 | 97 | 1.0 |
| 2 | 190 | 84 | 98 | 0.7 | 96 | 1.3 |
| 3 | 190 | 86 | 99 | 0.3 | 97 | 0.9 |
| 4 | 190 | 85 | 97 | 0.4 | 95 | 0.8 |
| 5 | 190 | 83 | 98 | 0.5 | 94 | 1.1 |
| 6 | 190 | 84 | 99 | 0.5 | 96 | 1.2 |
| 7 | 190 | 89 | 98 | 0.6 | 96 | 0.8 |
| 8 | 210 | 87 | 99 | 0.2 | 98 | 0.5 |
| Comparative Example | | | | | | |
| 1 | 190 | 87 | 20 | 1.5 | 10 | 3.5 |

TABLE 5-continued

| | Baking temperature, °C. | Surface luster | Weatherability | | | |
|---|---|---|---|---|---|---|
| | | | After 1000 hours | | After 3000 hours | |
| | | | Luster retention, % | Color difference, ΔE | Luster retention, % | Color difference, ΔE |
| 2 | 190 | 88 | 23 | 1.7 | 15 | 3.2 |
| 3 | 190 | 89 | 68 | 1.3 | 30 | 3.1 |
| 4 | 180 | 90 | 64 | 1.3 | 27 | 2.9 |

EXAMPLES 9 TO 20 AND COMPARATIVE EXAMPLES 5 TO 10.

Thermosetting powdery coating compositions were prepared in these Examples and Comparative Examples each by uniformly compounding either one of the copolymers A-7 to A-14 (Examples) or one of the commercial resin products a-1 to a-6 shown below (Comparative Examples) as the component (A) in an amount indicated in Table 6 below, one of the curing agents B-1, B-4 and B-6 to B-10 shown below as the component (B) in an amount indicated in Table 6, 30 parts of titanium dioxide in each of the formulations other than Example 9 and Comparative Examples 5 and 10, 0.5 part of a levelling agent (Modaflow, supra) in each of the formulations other than Comparative Example 5 and 0.5 part of benzoin in each of the formulations other than Comparative Example 5.

The resinous ingredients used in Comparative Examples as the component (A) were as follows.

a-1 to a-4: see preceding Comparative Examples.
a-5: fluorocarbon resin containing no solvent (Fostaflon, a product by Hechst Co.)
a-6: polyester resin containing no solvent and having an acid value of 30 mg KOH/g (Uralac P-2400, a product by DSM Co.)

Further, the curing agents used as the component (B) in the Examples and Comparative Examples were as follows.

B-1 and B-4: see the preceding Examples.
B-5: trimellitic anhydride
B-6: polyester resin containing no solvent and having an acid value of 220 mg KOH/g (Finedic M-8540, a product by Dai-Nippon Ink Chemical Co.)
B-7: dicyandiamide
B-8: adipic acid dihydrazide
B-9: diglycidyl terephthalate
B-10: triglycidyl isocyanurate Each of the blends in Examples 9 to 20 and Comparative Examples 5 to 10 was processed into a thermosetting powdery coating composition in just the same manner as in the preceding Examples and the coating compositions were subjected to the evaluation tests in the same manner as in the preceding Examples to give the results shown below and in Table 7. The baking treatment of the coating film was performed for 20 minutes at a temperature indicated in Table 7 and the coating film had a thickness of 40 μm. The appearance of the coating films was good in each of the Examples and Comparative Examples with complete smoothness excepting Comparative Example 5 in which the appearance of the coating film was poor. The impact resistance of the coating films was good in each of the Examples and Comparative Examples 5 to 7 but poor in Comparative Examples 8 to 10. The flexibility of the coating films was 7 mm in each of the Examples and Comparative Examples. The adhesion of the coating films to the substrate surface by the checkerboard test was 100/100 in each of the Examples and Comparative Examples excepting Comparative Example 5 in which the result was 0/100. The insusceptibility to stain of the coating films was good in each of the Examples with absolutely no line traces while faint but noticeable line trace was found in Comparative Examples 5, 9 and 10 and clearly noticeable line trace was found in Comparative Examples 6 to 8.

TABLE 6

| | Component (A) (parts) | Component (B) (parts) | Weight ratio of (B):(A) | Weight loss by heating, % |
|---|---|---|---|---|
| Example | | | | |
| 9 | A-7 (80.3) | B-4 (18.7) | 19:81 | 1.3 |
| 10 | A-7 (56.0) | B-4 (13.0) | 19:81 | 1.2 |
| 11 | A-7 (66.2) | B-7 (2.8) | 4:96 | 1.1 |
| 12 | A-7 (63.5) | B-8 (5.5) | 8:92 | 1.4 |
| 13 | A-7 (45.7) | B-6 (23.3) | 34:66 | 1.6 |
| 14 | A-8 (64.8) | B-5 (4.2) | 6:94 | 1.7 |
| 15 | A-9 (61.5) | B-6 (7.5) | 11:89 | 1.3 |
| 16 | A-10 (66.9) | B-4 (2.1) | 4:96 | 1.9 |
| 17 | A-11 (66.1) | B-10 (2.9) | 4:96 | 1.2 |
| 18 | A-12 (66.5) | B-9 (2.5) | 4:96 | 1.1 |
| 19 | A-13 (66.9) | B-9 (2.1) | 3:97 | 1.9 |
| 20 | A-14 (65.1) | B-10 (3.9) | 6:94 | 1.5 |
| Comparative Example | | | | |
| 5 | a-5 (100) | — | 0:100 | 1.6 |
| 6 | a-1 (60.0) | B-1 (9.0) | 13:87 | 1.7 |
| 7 | a-2 (60.0) | B-1 (9.0) | 13:87 | 1.3 |
| 8 | a-6 (64.2) | B-10 (4.8) | 7:93 | 1.9 |
| 9 | a-3 (59.2) | B-4 (9.8) | 14:86 | 1.8 |
| 10 | a-4 (56.1) | B-4 (12.9) | 19:81 | 1.4 |

The results of the weatherability test were given in three ratings of A for at least 85% of luster retention and a color difference smaller than 1.5, B for 60 to 85% luster retention and a color difference smaller than 3.0 and C for luster retention smaller than 60% and/or color difference of 3.0 or larger.

TABLE 7

| | Baking temperature, °C. | Surface luster | Weatherability | |
|---|---|---|---|---|
| | | | After 1000 hours | After 3000 hours |
| Example | | | | |
| 9 | 180 | 89 | A | A |
| 10 | 180 | 88 | A | A |
| 11 | 180 | 87 | A | A |
| 12 | 170 | 89 | A | A |
| 13 | 200 | 90 | A | A |
| 14 | 180 | 86 | A | A |
| 15 | 200 | 89 | A | A |
| 16 | 180 | 88 | A | A |
| 17 | 180 | 90 | A | A |
| 18 | 190 | 87 | A | A |
| 19 | 190 | 86 | A | A |
| 20 | 180 | 88 | A | A |
| Comparative Example | | | | |
| 5 | 380 | 27 | A | A |
| 6 | 190 | 87 | C | C |
| 7 | 190 | 88 | C | C |
| 8 | 190 | 90 | B | C |
| 9 | 190 | 89 | B | C |

TABLE 7-continued

| | Baking temperature, °C. | Surface luster | Weatherability | |
|---|---|---|---|---|
| | | | After 1000 hours | After 3000 hours |
| 10 | 180 | 87 | B | C |

As is clear from the results obtained in Examples 1 to 20, the coating films obtained from the inventive thermosetting powdery coating compositions are excellent in respect of the appearance, surface luster, impact resistance, flexibility, adhesion to the substrate surface, insusceptibility to stain and weatherability.

In contrast thereto, the coating films in Comparative Examples 1 to 2 obtained from a conventional polyester resin-based powdery coating composition are inferior in respect of the insusceptibility to stain and weatherability and the coating films in Comparative Examples 3 and 4 obtained from a conventional acrylic resin based coating composition are inferior in respect of the impact resistance, insusceptibility to stain and weatherability.

The thermoplastic powdery coating composition based on a fluorocarbon resin in Comparative Example 5 requires an extremely high baking temperature and the coating film prepared therefrom is inferior in respect of the appearance, surface luster, adhesion to the substrate surface and insusceptibility to stain. The coating films in Comparative Examples 6 to 8 obtained from a conventional polyester resin-based powdery coating composition are inferior in respect of the insusceptibility to stain and weatherability. The coating films in Comparative Examples 9 and 10 obtained from a conventional acrylic resin-based coating composition are inferior in respect of the impact resistance, insusceptibility to stain and weatherability.

To summarize, the thermosetting powdery coating composition of the present invention is very superior in respect of the workability in the coating works and the dispersibility of pigments as compared with thermoplastic fluorocarbon resin-based powdery coating compositions and the coating films obtained therefrom are excellent in respect of the adhesion to the substrate surface, surface luster, insusceptibility to stain, impact resistance and flexibility and also have much higher weatherability than any of conventional thermosetting powdery coating compositions. Accordingly, the inventive coating composition is very useful in all fields of applications in which a powdery coating composition is required. When comparison is made with conventional solution-type fluorocarbon resin-based coating compositions, moreover, the inventive coating composition is advantageous in respect of saving of materials and absence of the problems of environmental pollution as well as in respect of easiness in the process control and process automatization consequently with a great improvement in the efficiency of the coating works.

For example, a single coating with the inventive coating composition may give a coating film having a large thickness as desired so that the productivity of the coating works can be greatly improved to provide a coating film having full durability.

What is claimed is:

1. A thermosetting powdery coating composition which comprises, in admixture:
   (A) from 40 to 98 parts by weight of a fluorine-containing copolymer comprising a monomeric moiety derived from a fluoroolefin compound and having hydroxyl groups as the crosslinkable reactive groups of which the content of fluorine is at least 10% by weight, the intrinsic viscosity determined at 30° C. in tetrahydrofuran is in the range from 0.05 to 2 dl/g, the glass transition temperature is in the range from 35° C. to 120° C. and the weight loss by heating does not exceed 2%; and
   (B) from 60 to 2 parts by weight of a blocked isocyanate compound as the curing agent capable of forming crosslinks by reacting with the crosslinkable reactive groups in the fluorine-containing copolymer.

2. The thermosetting powdery coating composition of claim 1 wherein the fluoroolefin compound is selected from the group consisting of tetrafluoroethylene, chlorotrifluoroethylene, trifluoroethylene, vinylidene, fluoride, hexafluoropropylene and pentafluoropropylene.

3. The thermosetting powdery coating composition of claim 1 wherein the content of fluorine in the fluorine-containing copolymer is in the range from 15 to 72% by weight.

4. The thermosetting powdery coating composition of claim 1 wherein the fluorine-containing copolymer is a copolymer of a monomeric mixture comprising a fluoroolefin compound and a comonomer copolymerizable therewith and having a crosslinkable reactive group.

5. The thermosetting powdery coating composition of claim 4 wherein the monomeric mixture contains from 30 to 70% by moles of the fluoroolefin compound.

6. The thermosetting powdery coating composition of claim 1 wherein the fluorine-containing copolymer has a hydroxyl value in the range from 1 to 200 mg KOH/g.

7. The thermosetting powdery coating of claim 1 wherein the fluorine-containing copolymer has a hydroxyl value in the range from 20 to 140 mg KOH/g.

8. The thermosetting powdery coating composition of claim 7 wherein the glass transition temperature is in the range from 45° to 120° C.

9. The thermosetting powdery coating composition as claimed in claim 8, wherein the fluorine-containing copolymer is a copolymer of a monomeric mixture comprising a fluoroolefin compound and a comonomer copolymerizable therewith and having a crosslinkable reactive group.

10. The thermosetting powdery coating composition as claimed in claim 9 wherein the monomeric mixture contains from 30 to 70% by moles of the fluoroolefin compound.

11. The thermosetting powdery coating composition of claim 1 wherein the glass transition temperature is in the range from 45° to 120° C.

12. The thermosetting powdery coating composition as claimed in claim 9 wherein (A) and (B) are in a weight ratio of 50:50 to 97:3.

13. The thermosetting powdery coating composition as claimed in claim 12, wherein the glass transition temperature is 35° to 100° C.

14. The thermosetting powdery coating composition as claimed in claim 13, wherein the composition has a particle diameter not exceeding 400 μm.

* * * * *